United States Patent
Athsani et al.

(10) Patent No.: US 8,458,177 B2
(45) Date of Patent: Jun. 4, 2013

(54) AUTOMATED SEARCH (75) Inventors: Athellina Athsani, San Jose, CA (US);
Vitaliy Tsaran, Palo Alto, CA (US);
Alan Jay Brightman, Saratoga, CA (US)

(73) Assignee: Yahoo! Inc., Sunnyvale, CA (US)

( * ) Notice: Subject to any disclaimer, the term of this patent is extended or adjusted under 35 U.S.C. 154(b) by 218 days.

(21) Appl. No.: 12/364,472

(22) Filed: Feb. 2, 2009

(65) Prior Publication Data
US 2010/0198812 A1    Aug. 5, 2010

(51) Int. Cl.
*G06F 17/30* (2006.01)

(52) U.S. Cl.
USPC .......................................................... 707/732

(58) Field of Classification Search
None
See application file for complete search history.

(56) References Cited

U.S. PATENT DOCUMENTS

| | | | |
|---|---|---|---|
| 5,410,692 A * | 4/1995 | Torres | 1/1 |
| 5,920,859 A * | 7/1999 | Li | 715/205 |
| 6,564,147 B2 * | 5/2003 | Chen et al. | 701/213 |
| 6,571,279 B1 * | 5/2003 | Herz et al. | 709/217 |
| 6,778,651 B1 * | 8/2004 | Jost et al. | 379/201.01 |
| 7,084,758 B1 * | 8/2006 | Cole | 340/539.11 |
| 7,221,937 B2 * | 5/2007 | Lau et al. | 455/419 |
| 7,305,350 B1 * | 12/2007 | Bruecken | 705/346 |
| 7,743,056 B2 * | 6/2010 | Meisels et al. | 707/731 |
| 7,848,765 B2 * | 12/2010 | Phillips et al. | 455/456.3 |
| 2002/0103789 A1 * | 8/2002 | Turnbull et al. | 707/3 |
| 2002/0111154 A1 * | 8/2002 | Eldering et al. | 455/414 |
| 2002/0184089 A1 * | 12/2002 | Tsou et al. | 705/14 |
| 2004/0198396 A1 * | 10/2004 | Fransioli | 455/456.3 |
| 2004/0203847 A1 * | 10/2004 | Knauerhase et al. | 455/456.1 |
| 2005/0227722 A1 * | 10/2005 | Harris et al. | 455/518 |
| 2005/0240580 A1 * | 10/2005 | Zamir et al. | 707/4 |
| 2006/0123053 A1 * | 6/2006 | Scannell | 707/104.1 |
| 2006/0161599 A1 * | 7/2006 | Rosen | 707/201 |
| 2006/0270421 A1 * | 11/2006 | Phillips et al. | 455/457 |
| 2008/0005695 A1 * | 1/2008 | Ozzie et al. | 715/811 |
| 2008/0182590 A1 * | 7/2008 | Ruckart et al. | 455/456.3 |
| 2008/0189329 A1 * | 8/2008 | Weaver | 707/104.1 |
| 2008/0222734 A1 * | 9/2008 | Redlich et al. | 726/26 |
| 2008/0249983 A1 * | 10/2008 | Meisels et al. | 707/3 |
| 2008/0256044 A1 * | 10/2008 | Anderson et al. | 707/3 |
| 2008/0288354 A1 * | 11/2008 | Flinn et al. | 705/14 |
| 2009/0083060 A1 * | 3/2009 | Sherman et al. | 705/1 |
| 2010/0088418 A1 * | 4/2010 | Abzarian et al. | 709/227 |
| 2010/0162149 A1 * | 6/2010 | Sheleheda et al. | 715/764 |
| 2010/0299319 A1 * | 11/2010 | Parson et al. | 707/713 |

OTHER PUBLICATIONS

Farbham et al., "Swarm: Hyper Awareness, Micro Coordination, and Smart Convergence through Mobile Group Text Messaging." IEEE Proceedings of the 39th Hawaii International Conference on System Sciences—2006, pp. 1-10.*

* cited by examiner

*Primary Examiner* — Fred I Ehichioya
*Assistant Examiner* — Richard Bowen
(74) *Attorney, Agent, or Firm* — Hickman Palermo Truong Becker Bingham Wong LLP; Edward A. Becker (57) ABSTRACT

A system and method for automated search which may allow users to program their mobile devices to automatically bring up search results when a user or his mobile device meets a certain set of spatial, temporal, activity, or social context conditions.

28 Claims, 6 Drawing Sheets

Query Type: Time-Based

Query Title : [           ]

Query Description : [           ]

Start Time: ☐ ☐ ☐ ☐ [        ]

End Time: ☐ ☐ ☐ ☐ [        ]

Frequency: [              ]

FIG. 6A

Query Type: Location

Query Title : [           ]

Description : [               ]

Address: <u>cross streets</u>   <u>street number</u>   <u>location</u>

FIG. 6B

Query Type: Activity
Select Category

*Sports         *Science
*Food          *Finance
*Home & Garden   * Health

FIG. 6C

AUTOMATED SEARCH

BACKGROUND

1. Field of the Invention

The present invention relates to automated search.

2. Description of Related Art

With currently available technologies, a user has to manually input either a search query (e.g., "movie schedule") or information about a website (e.g., a URL) each time he wants to get some information, even if the user searches with a consistent set of queries at a frequent basis. This may become cumbersome, especially for disabled users.

BRIEF DESCRIPTION OF THE DRAWING FIGURES

Embodiments of the present invention are described herein with reference to the accompanying drawings, similar reference numbers being used to indicate functionally similar elements.

DETAILED DESCRIPTION

The present invention provides a system and method for automated search which may allow users to program their mobile devices to automatically bring up search results when a user or a user-designated entity meets a certain set of spatial, temporal, activity, or social context conditions. The invention may be carried out on one or more computers by computer-executable instructions, such as program modules, embodied in a computer-readable medium. Advantages of the present invention will become apparent from the following detailed description.

Figure 1:
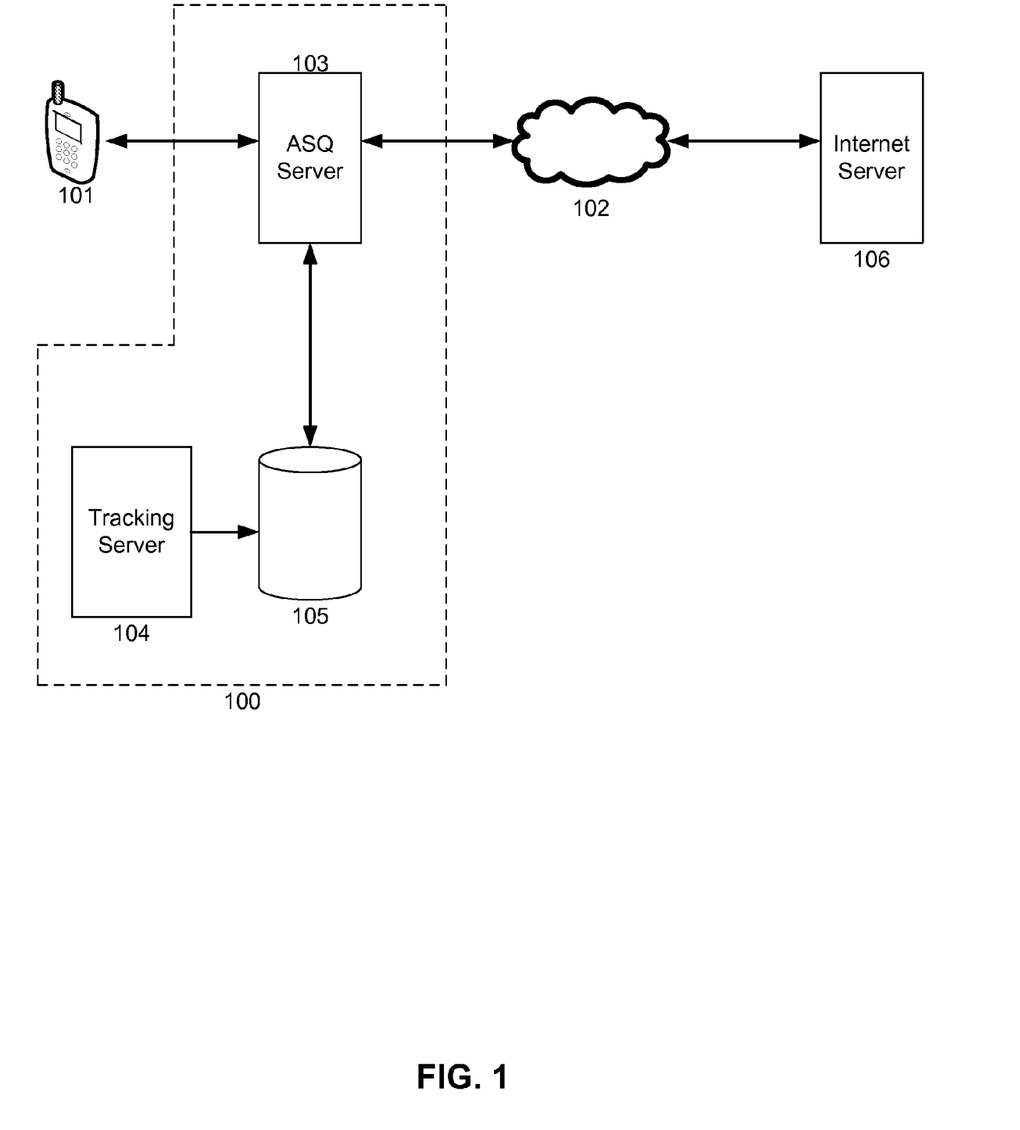
FIG. 1 illustrates an automated search system according to one embodiment of the present invention.

FIG. 1 illustrates an automated search system according to one embodiment of the present invention. A user's mobile device 101 may access the Internet, a proxy server or a local database 102 via an automated search query (ASQ) server 103. A user may use his mobile device 101 to store in a database 105 some search queries, one or more conditions to automatically initiate a search using a search query, or his explicit profile information. The user may also use the mobile device to edit search queries, conditions or profile information that have been either stored into the database 105 or obtained by the ASQ server 103. The mobile device 101 may be any electronic device having access to the Internet, a proxy server or a local database, e.g., a mobile phone, a smartphone, a portable computer, a portable GPS device, or a media player. The mobile device 101 may have a screen and/or a speaker for presenting search results of the automated search to its user.

A tracking server 104 may track a mobile device 101 to get the spatial (where), temporal (when), activity (what) and/or social context (who) information about the user or a user-designated entity, collectively "status information," and store it in the database 105 as real time status information first and as historical status information later on. The user-designated entity may be a user's family, friend or contact, and may have permitted the system 100 to collect his/her status information. The status information may include other information as well. The tracking server 104 may get the user's or user-designated entity's spatial information via positioning signals either from a mobile device or from a positioning system. With the positioning signals, the tracking server 104 may also infer the user's or user-designated entity's frequency or length of stay at a location.

The tracking server 104 may track or infer social context information about a user or user-designated entity from where he is or what he is doing. In one embodiment, the tracking server 104 may infer the social context information about a user from an RF ID, which may indicate the owner of a mobile device close to the user, and may be is associated with a brief profile of the owner. In one embodiment, users may register with a social networking website which may track the users' locations, do an aggregated social context sensing and create a heat map labeling each group of users with their most common interest. The tracking server 104 may infer identities of people who are around a user from the heat map. In one embodiment, the tracking server 104 may infer the user's relevance to other users by looking at the user's address book.

The tracking server 104 may track or infer the user's or user-designated entity's activities by monitoring the his movements. When the user is moving at a certain speed or following a certain pattern, the tracking server 104 may decide that the user is dancing. When the user is moving toward a train station, the tracking server 104 may decide that the user is trying to catch a train. In one embodiment, the tracking server 104 may determine the user's activities by where the user is, e.g., whether he is at a museum, a movie theater, or a stadium. In one embodiment, the tracking server 104 may determine the user's or user-designated entity's activities by social context. For example, if the user is in a big crowd of pop-music lovers, the tracking server 104 may determine that the user is at a pop-music concert. In one embodiment, the tracking server 104 may monitor the user's movements via an accelerometer.

The status information may also include a user's or a user-designated entity's browsing activities obtained by the tracking server 104 and stored in the database 105. In one embodiment, the tracking server 104 may monitor updates on certain websites, e.g., www.facebook.com, and www.twitter.com.

The database 105 may store users' or user-designated entity's status information, as real time status information first and as historical status information later on, browsing activities, and their profiles. The status information may include explicit information (e.g., a user's location) and implicit information (e.g., how far he is from his office). A user's profile may include explicit profile information from the user himself, and/or implicit profile information obtained by the ASQ server 103 through analyzing the user's status information including browsing activities.

The ASQ server 103 may look at a user's historical status information and browsing activity information in the database 105, infer implicit profile information about the user, and use the implicit profile information to supplement the explicit profile information. For example, it may be that a user did not include Starbucks™ in his explicit profile information. In one embodiment, the ASQ server 103 may look at the user's historical status information in the database 105 and find out that the user went to Starbucks™ 15 times during the last month. The ASQ server 103 may infer that the user goes to Starbucks™ stores frequently enough to add Starbucks™ to the user's profile as implicit profile information. In one embodiment, the ASQ server 103 may store "Starbucks online coupon" as a search query, and "when the user is moving toward a Starbucks™ store" as a condition to automatically start an Internet search.

In one embodiment, the ASQ server 103 may find out from a user's historical status information in the database 105 that a user often browses the website of a fashion boutique, infer that the user is interested in the fashion boutique Mango™ and add the fashion boutique to the user's profile as implicit profile information. In one embodiment, the ASQ server 103 may store "Mango" as a search query, and "when the user is within 1 mile of a Mango™ store" as a condition to automatically initiate a search.

Similarly, the ASQ server 103 may infer implicit profile information about a user-designated entity and use it to supplement the user-designated entity's explicit profile information.

The ASQ server 103 may compare a user's real time status information and his profile in the database 105, initiate an automated search when the real time status information meets a condition in the user's profile for automatically initiating a search, and return search results to the mobile device 101. The search results may be provided by an Internet server 106 running a website. The search results may be sent to the user as, e.g., a text message, an email, or a voicemail.

Each of the ASQ server 103, the tracking server 104 and the Internet/proxy/local database server 106 may be a computer system.

Figure 2:
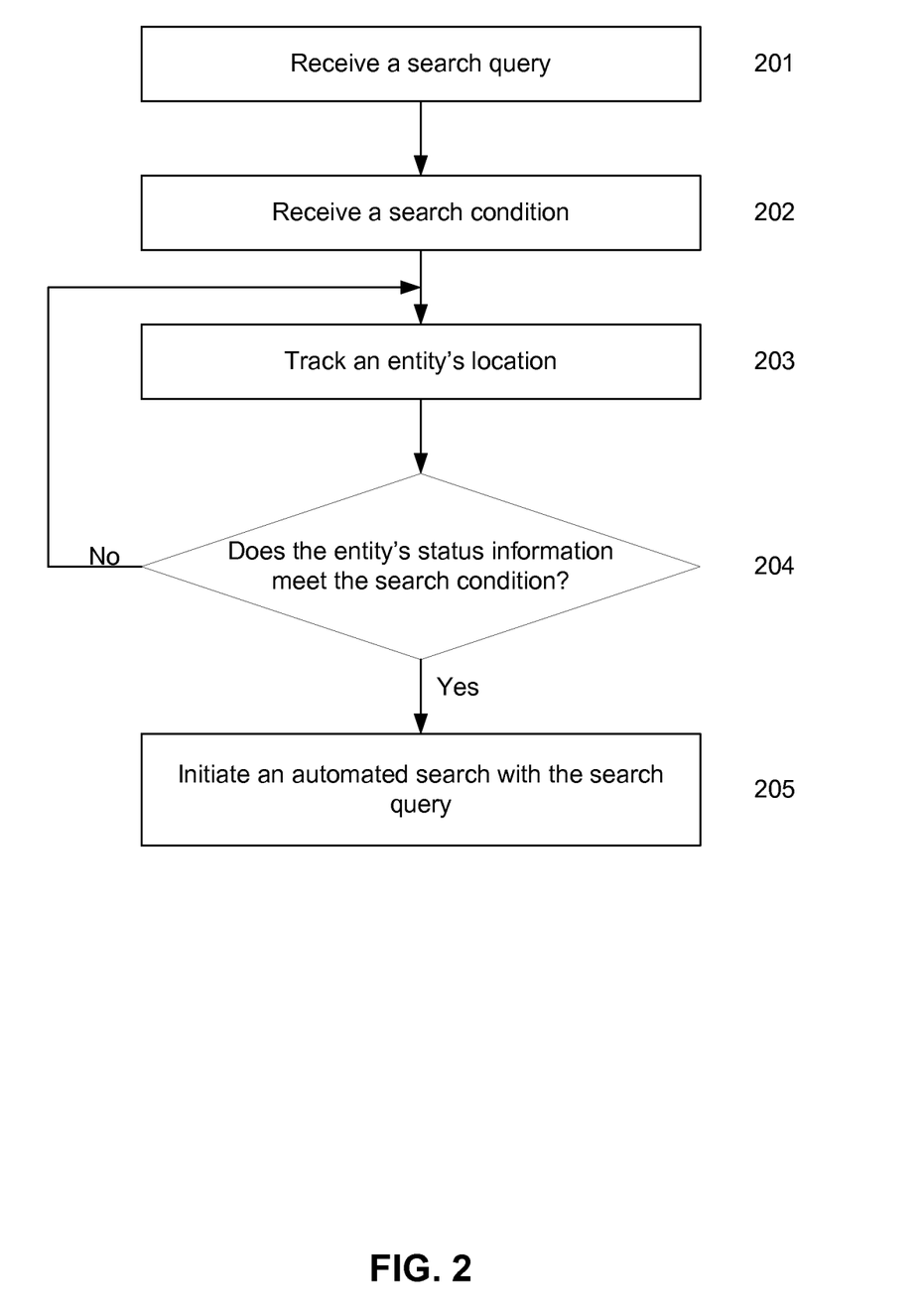
FIG. 2 illustrates a flowchart of a method for conducting an automated search based on user entered search queries according to one embodiment of the present invention.

FIG. 2 illustrates a flowchart of a method for conducting an automated search based on user-provided search queries according to one embodiment of the present invention. For example, a user may want to get a weather forecast before he steps out of his house and may preprogram the system 100 accordingly.

In one embodiment, at 201, the user may enter a search query, e.g., "weather, forecast, and audio."

At 202, the user may enter the condition for initiating an automated search using the query "weather, forecast and audio." The condition may be "when I am within 5 feet from the front door of my house," associated with information about the position of the front door.

At 203, the tracking server 104 may track the user's location. The ASQ server 103 may configure the tracking server 104 to detect the location of the mobile device 101 at regular time intervals (e.g., every 5 seconds) and store the real time location information in the database 105. The location information may be provided, e.g., by the GPS.

At 204, the ASQ server 103 may decide whether the user's status information meets the condition for initiating an automated search, e.g., by determining whether the user is within 5 feet from his front door. If not, the process may return to 203.

If the user's status information meets the condition for initiating an automated search, at 205, the ASQ server 103 may initiate an automated search with the query "weather, forecast and audio," receive a list of search results, and return a weather forecast to the user's mobile device 101. In one embodiment, the ASQ server 103 may keep a weather forecast website as a favorite website and automatically connect to the website.

The user may preprogram his mobile device 101 to display the weather forecast returned by the ASQ server 103 on a screen of his mobile device 101, or play the weather forecast via a speaker of his mobile device 101.

In addition to spatial information, the user may include temporal information in the search query. In one embodiment, to reduce the numbers of automated searches, the user may narrow down the condition by limiting the search to 7 am to 9 am.

Figure 3:
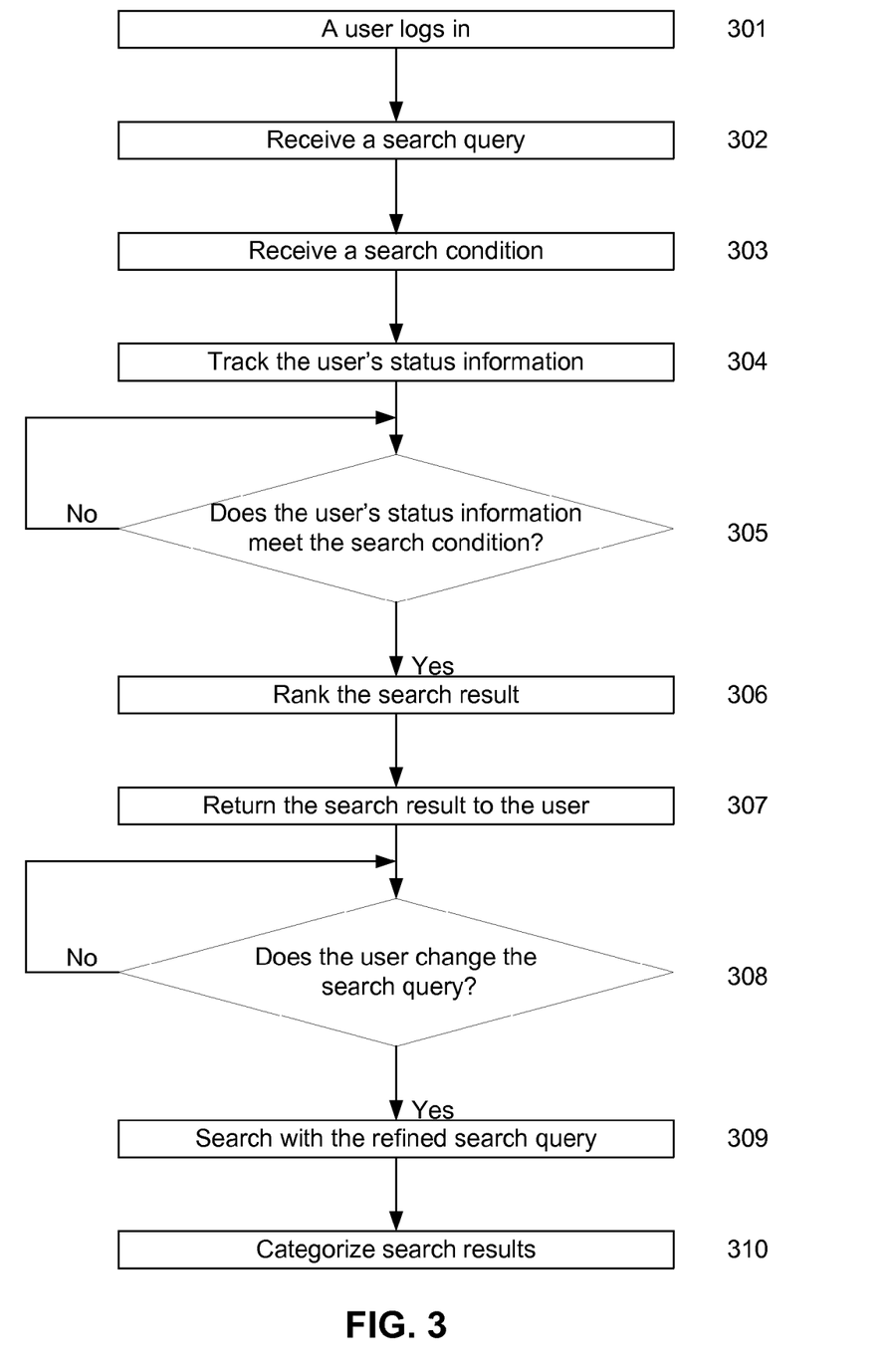
FIG. 3 illustrates a flowchart of a method for conducting an automated search according to one embodiment of the present invention.

FIG. 3 illustrates a flowchart of a method for conducting an automated search according to one embodiment of the present invention. A user may have signed up for the service of the automated search system 100, providing his user ID and password and his permission for the system 100 to track his status information and send him search results. The user's user ID may be, e.g., his mobile phone number.

At 301, the user may login.

At 302, the user may input a search query. The search query may include one or more keywords, or the URL of a website. For example, the user may want to get information about concerts in San Francisco, and may input the search query: San Francisco and concert.

In one embodiment, at 303, the user may set one or more conditions for the system 100 to meet for initiating an automated search. The condition may be location-based, temporal-based, event-based or activity-based. In one embodiment, the condition may be "if I am in San Francisco at 10-11 am on Fridays."

At 304, the tracking server 104 may monitor the user's location.

At 305, the ASQ server 103 may decide whether the condition for an automated search is met. If it is Friday, between 10 and 11 am, and the user's real time status information indicates that he is in San Francisco, the ASQ server 103 may initiate an automated search, using the search query "San Francisco, and concert."

At 306, the ASQ server 103 may rank the search results according to their relevancy to the search query using relevancy search algorithms. In one embodiment, the ASQ server 103 may also consider the user's profile when ranking the query results. For example, if the user's profile indicates that he likes classical music, the ASQ server 103 may give information about classical music concerts higher ranks so that they may be displayed earlier in the result list.

At 307, the ASQ server 103 may send the result list to the user, e.g., by displaying it on the screen of the user's mobile phone.

At 308, the user may adjust or refine the search if he likes. For example, he may add "philharmonic" to the search query.

At 309, the ASQ server 103 may search the Internet again using the adjusted search query.

At 310, the ASQ server 103 may aggregate all search results and categorize the search results for future use. In one embodiment, the ASQ server 103 may keep a list of websites of theaters which often host concerts and search these websites during future automated searches.

The tracking server 104 may continue to track the user's response to the search result, further changes to the search query, and store the information in the database 105.

In one embodiment, the search query at 302 may pertain to data that is specific or embedded to the user's mobile device such as an address book or data in a removable storage device within the mobile device. For example, the user may want to get contact information of people in his address book who is within 5 feet radius of his current location and may input the search query: Friends close by and current status.

In one embodiment, at 303, the user may set conditions to cover conditions set in the past or future. For example, the user wants to get stock information of GOOG and MSFT for 6 months after YHOO hits $10. In another example, the user may set a condition to look for 3G iPhone prices 8 months after the product is launched.

In one embodiment, at 303, the condition may be based on the status information of a user-designated entity, e.g., "if my wife is within the vicinity of Atlanta airport an hour before her scheduled flight." If the user's wife's GPS data confirms that she is in the Atlanta airport and it is 80 minutes before her flight, the ASQ server 103 may initiate an automated search at 304, using the search query "Delta flight 47 and current day".

Figure 4:
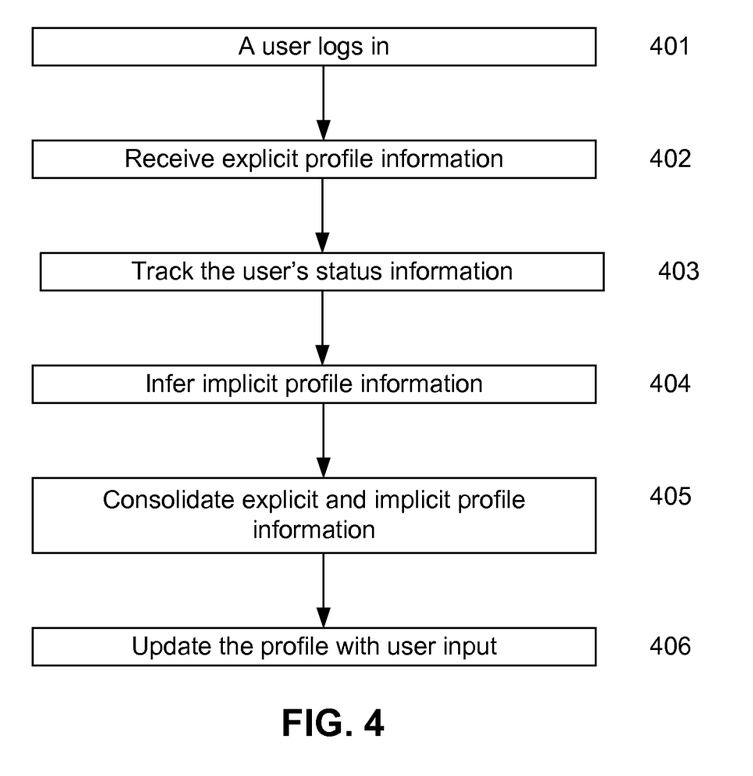
FIG. 4 illustrates a flowchart of a method for compiling a user profile according to one embodiment of the present invention.

FIG. 4 illustrates a flowchart of a method for compiling a user profile according to one embodiment of the present invention.

At 401, a user who has signed up with the service of the system 100 may login.

At 402, the ASQ server 103 may receive explicit profile information from a user. The profile information may include the user's preferences for activities, e.g., what he likes to do, what he hates to do, and what he is an expert at. The profile information may also include his like or dislike of particular locations, such as his gym, his favorite restaurants, shops and movie theaters, and a golf course he does not want to play again. The profile information may further include the user's schedule, e.g., catches a train between 8 to 8:30 am, works in his office between 9 am to 5 pm, and goes to the gym at 6 pm on Tuesdays and Thursdays. The user profile information may include one or more of his methods of communication, e.g., www.facebook.com, www.aim.com, and messenger.yahoo.com.

At 403, the tracking server 104 may track the user's activities including, e.g., personal activities and browsing activities, and store information about the user's activities as historical activity information in the database 106. The personal activity information may include the user's status information, and the browsing activities may include the websites the user visited, time he spent on each web page, his on-line shopping records and on-line services he registered for.

At 404, the ASQ server 103 may infer implicit profile information about the user from the historical activity information. For example, the user often may go to see movies on Saturdays, and so may search for movie schedules. In one embodiment, the ASQ server 103 may infer as implicit profile information that the user likes to see movies on Saturdays, and may add to the user's profile "movie schedule" as a search query, "Saturday, 10-11 am" as a condition to initiate an automated search, so that the user may receive a movie schedule each Saturday.

At 405, the ASQ server 103 may consolidate explicit and implicit profile information and generate a profile for the user. The profile may include time, location, activity and social information, e.g., the user's typical schedule, routine locations, most frequented locations, routine activities, contextual information about an activity, and social contacts.

At 406, the user may review and edit the profile. The user may delete or ignore some implicit profile information added to his profile by the system 100.

403-406 may repeat to keep the user's profile up to date. The user's profile may be used with the method shown in FIG. 3 or FIG. 5.

In one embodiment, the system 100 may compile a profile for a user-designated entity. At 402, the ASQ server 103 may receive explicit profile information from a user about a user-designated entity. At 403, the tracking server 104 may track status information of the user designated entity, and/or any known information on the entity from information sites such as Wikipedia etc pertaining to the entity. For example, if the user enters stock information such as Yahoo Inc stocks, the ASQ server 103 may browse sites like finance.yahoo.com or www.nasdaq.com to obtain stock information which may include stock price, earning call information etc. The ASQ server 103 may infer implicit profile information about the user-designated entity and consolidate the implicit profile information with explicit profile information about the entity.

Figure 5:
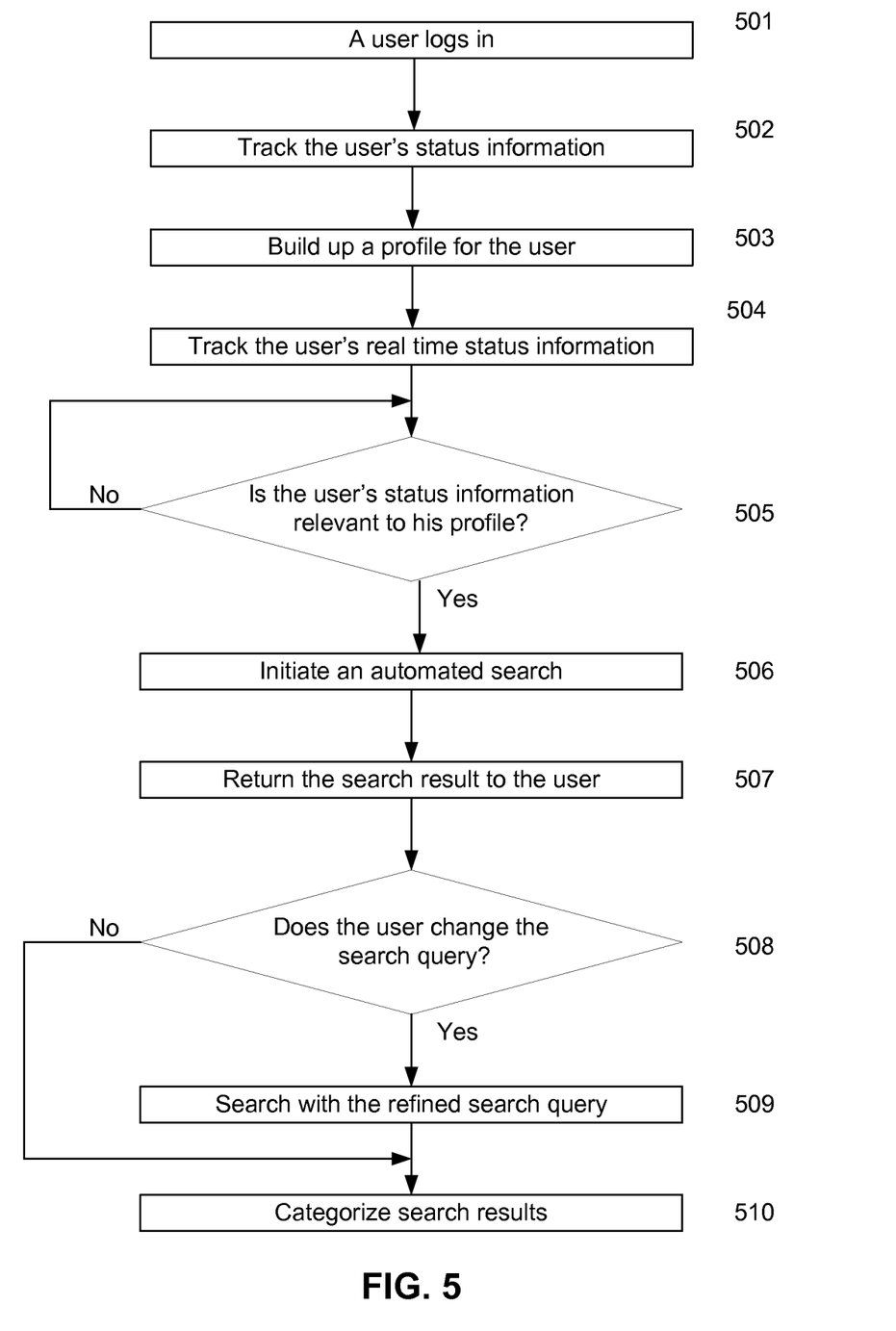
FIG. 5 illustrates a flowchart of a method for conducting an automated search based on system-derived search queries according to one embodiment of the present invention.

FIG. 5 illustrates a flowchart of a method for conducting an automated search based on system-derived search queries according to one embodiment of the present invention.

At 501, a user may login. The user may have provided his user ID, password and permission for the system 100 to track his activities and send search results, but may not enter any profile information.

At 502, the tracking server 104 may track the user to obtain his status information and browsing history information, and store the information in the database 106.

At 503, the ASQ server 103 may analyze the information in the database 105 and build up a profile for the user.

At 504, the tracking server 104 may obtain the user's real time status information including explicit and implicit information. The explicit information may include, e.g., the time 5:05 pm, May 24, his location, and his movement (e.g. slowly in one direction). The implicit information may be inferred from the explicit information, e.g., he is 200 feet from a stadium.

At 505, the ASQ server 103 may use a relevancy algorithm to determine whether his real time status information is relevant to his profile.

If the user's real time status information has some relevancy to his profile, the ASQ server 103 may automatically produce some search queries and initiate one or more searches with the search queries at 506. In one embodiment, the ASQ server 103 may find out that the user has been near a stadium for about 5 minutes and is moving slowly. With a relevancy algorithm, the ASQ server 103 may find out that there is some relevancy between the user's real time status and his profile, since the user goes to the stadium frequently. The ASQ server 103 may decide that the user is waiting in a line to buy a ticket to the stadium. The ASQ server 103 may initiate an automated search, e.g., using the name of the stadium as the search query. The ASQ server 103 may find out that a basketball game will begin in about an hour, and the stadium's tickets are available online.

At 507, the ASQ server 103 may send a text message to the user, asking him whether he is interested in buying a ticket to the basketball game online.

At 508, it may be determined whether the user changed the search. If the user did not change the search query and purchased the ticket online as the ASQ server 103 suggested, the process may proceed to 510.

If the user wanted to buy a hockey game ticket instead and changed the search query, at 509, the ASQ server 103 may initiate a new search with the changed search query. The process may then proceed to 510.

At 510, the ASQ server 103 may aggregate all user responses and categorize the user responses to a system recognizable category for future use. For example, the ASQ server may add either "basketball" or "hockey" to the users profile.

Figure 6A:
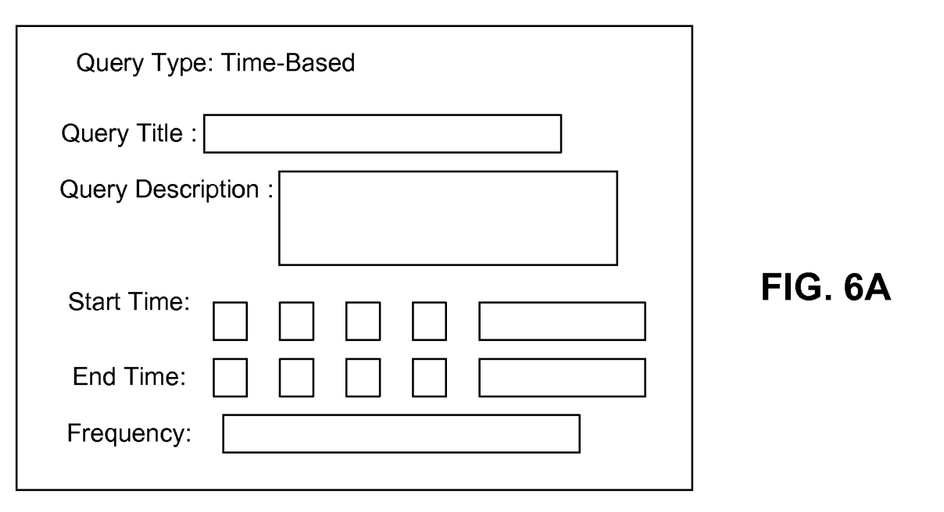
FIGS. 6A, 6B and 6C illustrate embodiments of interfaces for a user to set up an automated search.
Figure 6B:
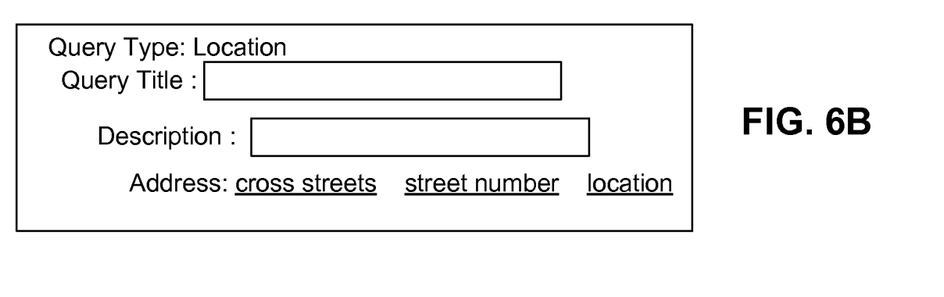
Figure 6C:
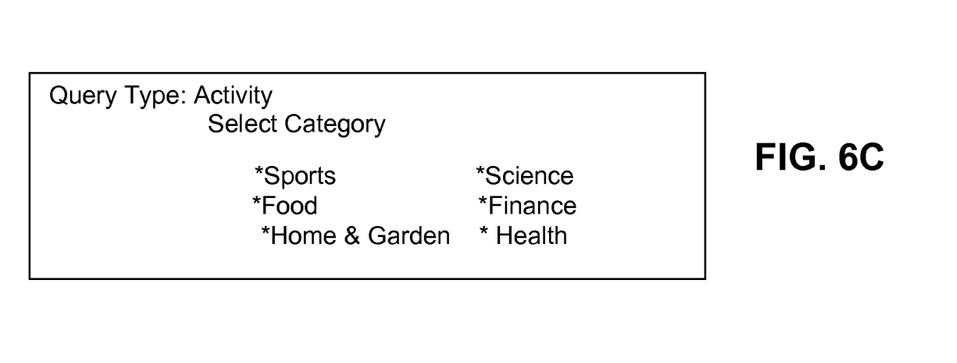

FIGS. 6A, 6B and 6C illustrate embodiments of different user interfaces for setting up an automated search. FIG. 6A shows an embodiment of a user interface of time based automated search. A user may input a query title (e.g., train schedule) and the start and end time he wants the automated search to be done (e.g., 8 am to 8:30 am). The user may also input a query description, e.g., the name of a train station where he usually catches a train.

FIG. 6B shows an embodiment of a user interface of location based automated search. In addition to a query title and a query description, a user may store information about a location, e.g., cross streets, street number or positioning information of the location.

FIG. 6C shows an embodiment of a user interface of activity based automated search. As shown, the user may select a category of an activity. It will be appreciated that each of the displays FIGS. 6A-6C may be available on one device, depending on the type of query a user may wish to have run automatically at a particular time. In one embodiment, depending on how the user's profile may have changed, the user's device may select among two or more of the displays shown in FIGS. 6A-6C and present a different one in accordance with changes in the user's profile.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A computer-implemented method comprising:
   collecting status information for a plurality of entities;
   determining a subset of entities from the plurality of entities, wherein the subset of entities is currently co-located within a specified distance of a particular entity from the plurality of entities;
   analyzing the collected status information for the subset of entities;
   determining, based upon analyzing the collected status information for the subset of entities, shared characteristic data for the subset of entities;
   determining an activity of the particular entity based on the shared characteristic data;
   retrieving, from profile data for the particular entity, search condition data identifying one or more search conditions;
   automatically initiating a search when both the collected status information for the particular entity and the activity satisfy the one or more search conditions identified in the search condition data;
   updating profile data for the particular entity based upon the determined activity; and
   providing search results;
   wherein the method is performed by one or more computing devices.

2. The method of claim 1, wherein the status information for a particular entity from the plurality of entities includes one or more of a time of day, a location of the particular entity, a current activity for the particular entity, social context information for the particular entity or browsing activity information for the particular entity.

3. The method of claim 1, wherein the particular entity is a user.

4. The method of claim 1, wherein the particular entity is a user-designated entity.

5. The method of claim 1, further comprising: prior to initiating the search, determining that a current time is within a range of times-of-day during which automatic initiation of searches is permissible.

6. The method of claim 1, further comprising:
   receiving timing information that specifies a future time at which the one or more search condition become valid;
   storing the timing information; and
   prior to initiating the search, determining that a current time is not sooner than the future time indicated in the timing information;
   wherein the future time is later than a time at which the timing information is received from the user.

7. The computer-implemented method of claim 1, wherein the profile data for the particular entity includes explicit profile data specified by the particular entity.

8. The method of claim 1, wherein the collecting status information for the plurality of entities includes collecting status information from a social networking website.

9. The method of claim 1, wherein updating profile data for the particular entity based upon the determined activity includes updating profile data for the particular entity to include data that indicates the determined activity.

10. The method of claim 1, wherein the determining the shared characteristic data comprises determining, based on status information for the subset of entities, that the subset of entities has a shared characteristic of being pop music lovers; and wherein the determining an activity of the particular entity comprises determining that the particular entity is currently at a pop music concert.

11. The method of claim 1, wherein the profile data for the particular entity includes data that can be used as one or more of a search query or a search condition.

12. The method of claim 1, wherein:
   the profile data for the particular entity includes implicit profile data for the particular entity, and
   the method further comprises determining the implicit profile data for the particular entity by analyzing historical status information for the particular entity.

13. The method of claim 12, wherein analyzing the historical status information for the particular entity includes identifying, in the historical information for the particular entity, data that can be used as one or more of a search query or a search condition.

14. The method of claim 12, wherein analyzing the historical status information for the particular entity includes using a relevancy algorithm to compare the historical status information for the particular entity with the one or more search conditions to determine relevancy.

15. One or more non-transitory computer-readable media storing instructions which, when processed by one or more processors, cause:
   collecting status information for a plurality of entities;
   determining a subset of entities from the plurality of entities, wherein the subset of entities is currently co-located within a specified distance of a particular entity from the plurality of entities;
   analyzing the collected status information for the subset of entities;
   determining, based upon analyzing the collected status information for the subset of entities, shared characteristic data for the subset of entities;
   determining an activity of the particular entity based on the shared characteristic data;
   retrieving, from profile data for the particular entity, search condition data identifying one or more search conditions;
   automatically initiating a search when both the collected status information for the particular entity and the activity satisfy the one or more search conditions identified in the search condition data;
   updating profile data for the particular entity based upon the determined activity; and
   providing search results.

16. The one or more non-transitory computer-readable media of claim 15, wherein the status information for a particular entity from the plurality of entities includes one or more of a time of day, a location of the particular entity, a current activity for the particular entity, social context information for the particular entity or browsing activity information for the particular entity.

17. The one or more non-transitory computer-readable media of claim 15, wherein the particular entity is a user.

18. The one or more non-transitory computer-readable media of claim 15, wherein the particular entity is a user-designated entity.

19. The one or more non-transitory computer-readable media of claim 15, further storing additional instructions which, when processed by the one or more processors causes: prior to initiating the search, determining that a current time is within a range of times-of-day during which automatic initiation of searches is permissible.

20. The one or more non-transitory computer-readable media of claim 15, further storing additional instructions which, when processed by the one or more processors causes:
receiving timing information that specifies a future time at which the one or more search conditions become valid;
storing the timing information; and
prior to initiating the search, determining that a current time is not sooner than the future time indicated in the timing information;
wherein the future time is later than a time at which the timing information is received from the user.

21. The one or more non-transitory computer-readable media of claim 15, wherein the profile data for the particular entity includes explicit profile data specified by the particular entity.

22. The one or more non-transitory computer-readable media of claim 15, wherein updating profile data for the particular entity based upon the determined activity includes updating profile data for the particular entity to include data that indicates the determined activity.

23. The one or more non-transitory computer-readable media of claim 15, wherein the determining the shared characteristic data comprises determining, based on status information for the subset of entities, that the subset of entities has a shared characteristic of being pop music lovers; and wherein the determining an activity of the particular entity comprises determining that the particular entity is currently at a pop music concert.

24. The one or more non-transitory computer-readable media of claim 15, wherein the profile data for the particular entity includes data that can be used as one or more of a search query or a search condition.

25. The one or more non-transitory computer-readable media of claim 15, wherein:
the profile data for the particular entity includes implicit profile data for the particular entity, and
the one or more non-transitory computer-readable media store additional instructions which, when processed by the one or more processors causes determining the implicit profile data for the particular entity by analyzing historical status information for the particular entity.

26. The one or more non-transitory computer-readable media of claim 25, wherein analyzing the historical status information for the particular entity includes identifying, in the historical information for the particular entity, data that can be used as one or more of a search query or a search condition.

27. The one or more non-transitory computer-readable media of claim 25, wherein analyzing the historical status information for the particular entity includes using a relevancy algorithm to compare the historical status information for the particular entity with the one or more search conditions to determine relevancy.

28. The one or more non-transitory computer-readable media of claim 27, wherein the collecting status information for the plurality of entities includes collecting status information from a social networking website.

* * * * *